United States Patent
Srinivasan et al.

(10) Patent No.: US 7,328,259 B2
(45) Date of Patent: Feb. 5, 2008

(54) SYSTEMS AND METHODS FOR POLICY-BASED APPLICATION MANAGEMENT

(75) Inventors: Bhaskar Srinivasan, San Carlos, CA (US); Matthias Eichstaedt, Sunnyvale, CA (US); Swami Nathan, San Jose, CA (US)

(73) Assignee: Symantec Operating Corporation, Cupertino, CA (US)

( * ) Notice: Subject to any disclaimer, the term of this patent is extended or adjusted under 35 U.S.C. 154(b) by 923 days.

(21) Appl. No.: 10/703,683

(22) Filed: Nov. 7, 2003

(65) Prior Publication Data

US 2004/0111725 A1    Jun. 10, 2004

Related U.S. Application Data

(60) Provisional application No. 60/426,962, filed on Nov. 8, 2002.

(51) Int. Cl.
*G06F 15/173* (2006.01)
*G06F 15/16* (2006.01)

(52) U.S. Cl. .................. 709/223; 709/203; 709/224; 718/105; 370/235

(58) Field of Classification Search ............... 709/203, 709/223–226, 229, 238–239; 370/229–231, 370/235, 351–353; 718/100, 105
See application file for complete search history.

(56) References Cited

U.S. PATENT DOCUMENTS

| | | | |
|---|---|---|---|
| 6,556,659 B1 | 4/2003 | Bowman-Amuah | |
| 6,714,976 B1 | 3/2004 | Wilson et al. | |
| 6,775,825 B1 | 8/2004 | Grumann et al. | |
| 6,801,940 B1 * | 10/2004 | Moran et al. | 709/224 |
| 6,857,020 B1 * | 2/2005 | Chaar et al. | 709/226 |
| 6,985,955 B2 * | 1/2006 | Gullotta et al. | 709/223 |
| 7,134,141 B2 * | 11/2006 | Crosbie et al. | 709/224 |
| 7,194,533 B1 * | 3/2007 | DeLuca | 709/224 |
| 7,222,190 B2 * | 5/2007 | Klinker et al. | 709/238 |

* cited by examiner

*Primary Examiner*—Bharat Barot
(74) *Attorney, Agent, or Firm*—Meyertons Hood Kivlin Kowert & Goetzel, P.C.; B. Noël Kivlin

(57) ABSTRACT

Systems and methods are provided for managing a plurality of applications comprising application instances running on a plurality of computer servers. A system for managing application includes an application scheduler. The application scheduler receives at least one policy for managing the applications over the computer servers. The application scheduler also receives usage information indicating performance of the applications and the computer servers. The application scheduler then applies the at least one policy to the usage information to determine whether policy violations exist. The application scheduler then determines and executes a modification action of the applications in response to the policy violation.

45 Claims, 8 Drawing Sheets

SYSTEMS AND METHODS FOR POLICY-BASED APPLICATION MANAGEMENT

CROSS-REFERENCE TO RELATED APPLICATIONS

This application claims the benefit of U.S. Provisional Application Ser. No. 60/426,962 titled "Rule Based Dynamic Application and Server Management in a Resource-Shared Data Center," filed Nov. 8, 2002, which is incorporated herein by reference.

BACKGROUND OF THE INVENTION

1. Field of the Invention

The present invention relates generally to the field of computer processing and more particularly to systems and methods for policy-based application management.

2. Description of the Prior Art

Previously, computer applications only had the ability to run on one computer server. As the size and complexity of computer applications grew and computer environments changed from centralized architectures to distributed architectures, the computer applications also evolved into having the ability to run over multiple computer servers. For organizational and security reasons, these computer servers have been grouped into pools or clusters interconnected through communication networks.

In one prior art system, a load balancer controls how users are directed to the applications running on multiple servers. In one example where one application is running over six computer servers, the load balancer balances user requests for the application between the six computer servers. The load balancer directs a first user to a first computer server and then directs a second user to a second computer server. The load balancer then continues to distribute the users between the computer servers in a round robin fashion. In another example, the load balancer continues to direct users to the first computer server until a maximum load is reached and thereafter directs users to a second computer server.

One problem with the aforementioned system is the applications are running on the computer servers on at least the idling level and continue to occupy and consume computing resources. Thus, when no users are accessing the application, the application continues to consume computer resources that could be used by other applications. Therefore, the utilization of the computer servers is not optimized.

Another problem with prior art systems is that they require manual management of applications over the computer servers. At installation time, the application is statically assigned to execute on specific computer servers. Any additions or removals of computer servers executing the application must be manually performed by computer administrators. Furthermore, the computer administrators must constantly monitor the application and their resources to detect overload or underload situations, which increases operation costs and inefficiency.

SUMMARY OF THE INVENTION

The present invention addresses the problems discussed above by providing systems, methods, and software products for managing a plurality of applications comprising application instances running on a plurality of computer servers. A system for managing applications includes an application scheduler. The application scheduler receives at least one policy for managing the applications over the computer servers. The application scheduler also receives usage information indicating performance of the applications and the computer servers. The application scheduler then applies the at least one policy to the usage information to determine whether policy violations exist. The application scheduler then determines and executes a modification action of the applications in response to the policy violation.

In various implementations of the method, the modification action may include one or more of the following: activating an application instance on one of the computer servers, deactivating an application instance on one of the computer servers, and migrating an application instance between the computer servers. The usage information may include processor usage, memory usage, a number of users and a number of connections to one of the applications. The policy may enforce a limit on processor usage or on memory usage. The policy may also be based on a server class.

By managing applications through the use of policies, the application scheduler advantageously allows run-time application scheduling on multiple servers based on load conditions. Additionally, the application scheduler also provides dynamic resource allocation based on resource availability. Both of these functions result in increased server utilization in a data center. This increased utilization and improved efficiency has significant economic benefit in lowering operation and capital costs of a data center. Furthermore, by controlling the resource allocation, the application scheduler can affect the application performance and thus provide improved response time for the application users.

DETAILED DESCRIPTION OF THE INVENTION

The present invention provides systems and methods for managing a plurality of applications comprising application instances running on a plurality of computer servers. In order to better understand the present invention, aspects of the environment within which the invention operates will first be described.

Figure 1:
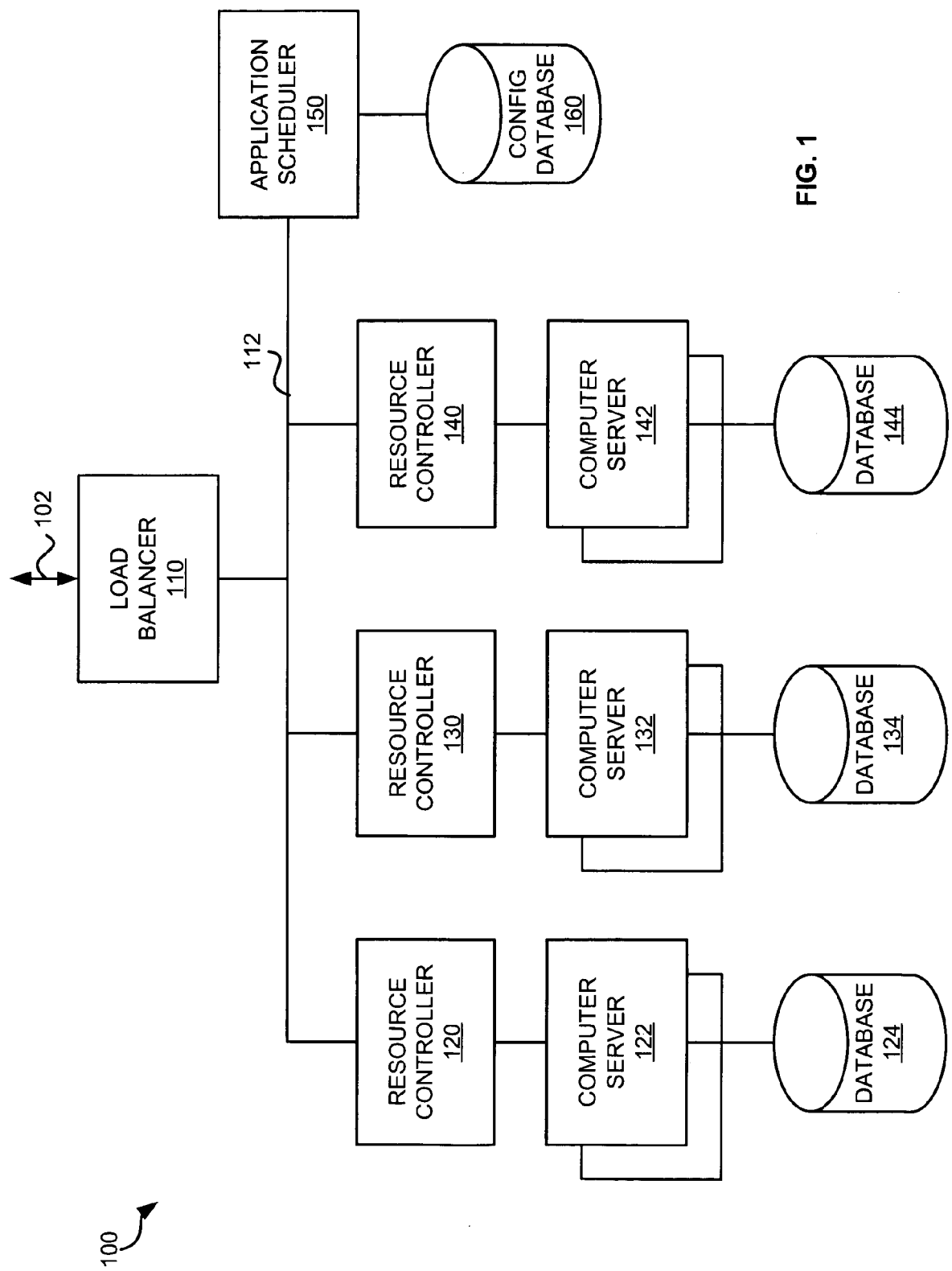
FIG. 1 is a symbolic diagram of a system for managing applications in an exemplary implementation of the invention.

FIG. 1 depicts a symbolic diagram of a system 100 for managing applications in an exemplary implementation of the invention. In a resource-shared data center such as system 100, the application and the computing resources are decoupled so that an application may be dynamically installed and executed on any available computer server based on demand. Applications are software programs that are executed by computer servers. In some embodiments, the applications are HTTP applications, non-HTTP applications, and/or 3 tier web applications. The applications comprise application instances. Application instances are individual objects or occurrences of the application. In one example, the application has many application instances in order for different instances to run on different computer servers.

The system 100 includes a link 102, a load balancer 110, a network connection 112, resource controllers 120, 130, 140, computer servers 122, 132, 142, databases 124, 134, 144, an application scheduler 150, and a configuration database 160. The link 102 is coupled to the load balancer 110. The link 102 is also coupled to at least one communication network to which users are connected. The communication network and users are not shown in FIG. 1 for the sake of simplicity. The communication network can be any kind of network or combination of networks. Some examples of the communication network are a Local Area Network (LAN), a Wide Area Network (WAN), a public switched telephone network (PSTN), and the Internet.

The network connection 112 is connected to the load balancer 110, the resource controllers 120, 130, 140, and the application scheduler 150. The load balancer 110 is any device or system configured to receive user requests and manage connections between the applications and the users.

The resource controllers 120, 130, 140 are any devices or systems configured to control the resource utilization of a corresponding group of computer servers. In some embodiments, the resource controllers 120, 130, and 140 are software modules in each computer server pool. In these embodiments, the resource controllers 120, 130, and 140 find and provide the necessary computer resources for a scheduled application based on the administrator-specified matching server characteristics and resource availability. In some embodiments, the resource controllers 120, 130, 140 include event generators to notify devices or modules whether an upper or lower limit threshold has been reached. As a result, the event generator can notify an application scheduler 150 that an event occurred when a threshold was reached.

The computer servers 122, 132, and 142 are any computer processing systems configured to execute computer applications. These computer servers 122, 132, and 142 typically include processors, memory, and communication interfaces. Although only one computer server such as computer 122 is numbered, the computer server 122 may actually represent a group, pool, or cluster of computer servers as shown by the corresponding shadow box. The databases 124, 134, and 144 are any devices or systems configured to store data.

Figure 2:
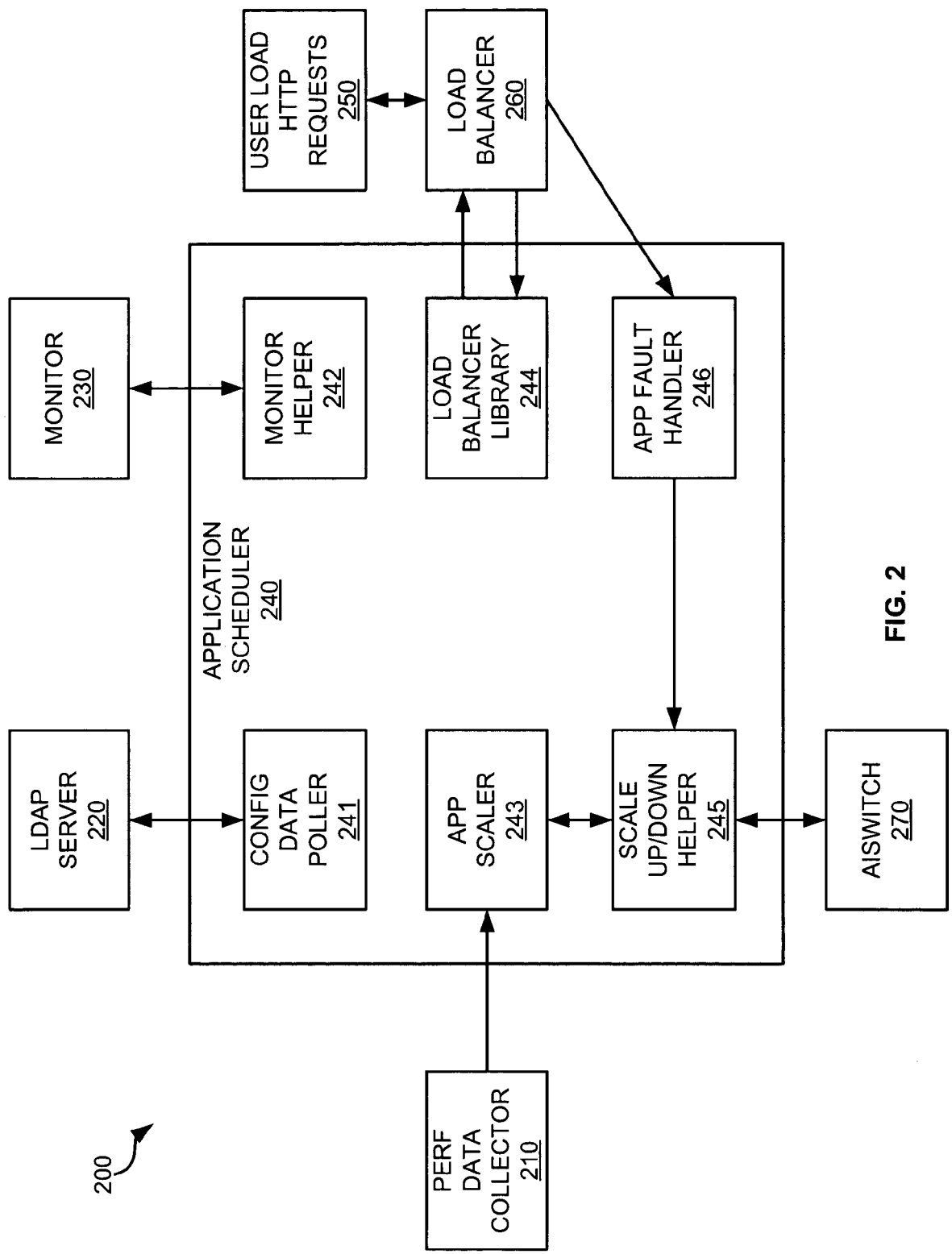
FIG. 2 is a block diagram of an application scheduler with related systems in an exemplary implementation of the invention.

The application scheduler 150 is any device or system configured to manage applications running on the computer servers 122, 132, and 142. FIG. 2 depicts a configuration of one embodiment of the application scheduler 150. FIGS. 3-4 and 6-8 depict various operations in different embodiments of the application scheduler 150. The configuration database 160 is any database configured to store configuration parameters for managing applications running on the computer servers 122, 132, and 142. In some embodiments, the policies for managing applications are stored in the configuration database 160 as further discussed below.

FIG. 2 depicts a block diagram of an application scheduler with related systems in an exemplary implementation of the invention. A system 200 in FIG. 2 includes a performance data collector 210, a Lightweight Directory Access Protocol (LDAP) server 220, a monitor 230, an application scheduler 240, user load HTTP requests 250, a load balancer 260, and an AISwitch 270. The application scheduler 240 includes a configuration data poller 241, a monitor helper 242, an application scaler 243, a load balancer library 244, a scale up/down helper 245, and an application fault handler 246.

The performance data collector 210 is any device or system configured to collect usage information indicating performance of the applications, application instances, and/or computer servers 122, 132, and 142. The LDAP server 220 is any device or system configured to perform LDAP functions. The monitor 230 is any device or system configured to monitor the operations and performance of the application scheduler 240. A configuration data poller 241 is a module configured to retrieve configuration information such as policies. The monitor helper 242 is a module that gathers and provides data to an external performance and status monitor.

In one embodiment, the application scheduler 240 uses an application scaler 243 algorithm for each application it manages. The application scaler 243 algorithm looks at a prespecified set of runtime parameters and values to decide whether to make a new application instance running or to put an application instance to a sleeping state. In this embodiment, the application scheduler 240 uses this application scaler 243 algorithm in combination with scaling parameters and runtime data for scheduling parameters. Scaling parameters are variables that direct scaling decisions such as a number of connections to an application instance and percentage of server CPU used by an application instance.

The application scheduler 240 interacts with the load balancer 260 through the load balancer library 244. The application scheduler 240 uses the APIs provided by the load balancer vendor to interact with the load balancers 260. The load balancer library 244 comprises of modules that user the load balancer APIs to read status information from the load balancer 260 and to send control information to the load balancers 260. An example of status information that is read is a number of connections to an instance of an application. An example of status information sent to the load balancer 240 is to disconnect (suspend) an instance of an application and stop it from accepting new user connections. The application scheduler 240 also uses the load balancer library 244, which implements the vendor APIs, to alter the load balancing algorithms, load balancer initialization, etc.

The scale up/down helper 245 is a module configured to assist with scaling up and down functions, which are described below in FIGS. 6 and 7. In some embodiments, HTTP requests are directed to the load balancer 260 by the application fault handler 246 if there is no suitable application instance available and running. The application fault handler 246 periodically refreshes this HTTP request to keep the HTTP request alive. The application fault handler 246 then requests the application scheduler 240 to make a running application instance available to handle this pending request. In some embodiments, once all user http requests are done, the application instance is put to a sleeping mode or an inactive mode. In this sleeping or inactive mode, the application does not consume any resources, except disk storage. This inactive application instance can be made to run on any available computer server when demand arises.

The user load HTTP requests 250 may take the format of HTTP requests for an application. In other embodiments, the request can be any request for an application. The AISwitch 270 is a component within a resource controller for resource allocation for application instances. In some embodiments, the AISwitch 270 performs functions of restoring and taking a snapshot of application instances.

Figure 3:
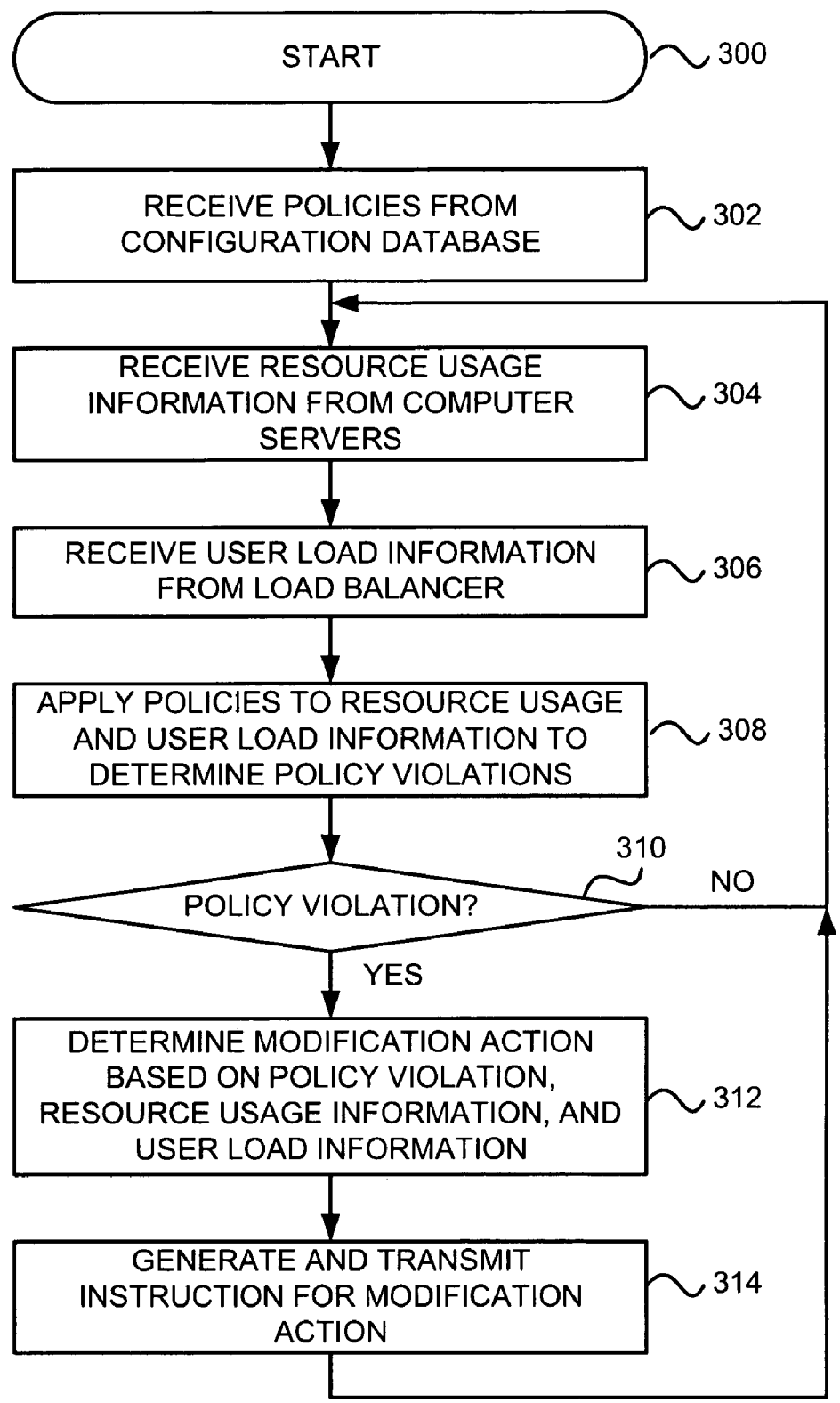
FIG. 3 is a flowchart for an application scheduler in an exemplary implementation of the invention.

FIG. 3 depicts a flowchart for the application scheduler 150 in an exemplary implementation of the invention. FIG. 3 begins in step 300. In step 302, the application scheduler 150 receives policies from the configuration database 160. The policies are constructed to manage the applications over the computer servers 122, 132, and 142. Policies are any rules, thresholds, priorities, conditions and/or limits that control the management and utilizations of the applications and computer resources. Advantageously, an administrator can configure policies such as threshold events and server utilization rules, which can dynamically alter the application performance and system utilization to a desired level. Various non-limiting examples of policies are set forth below. In some embodiments, the policies can be added or edited through a standard web interface.

One type of policy is a threshold-based activation or deactivation. One example of a policy for threshold based activation is as follows: if the memory usage for an application exceeds 50% of the memory capacity, then start a new application instance. Another example for a policy for threshold based deactivation is as follows: if the CPU usage falls below 5%, then deactivate the application instance or put the application instance in a sleeping mode.

Another type of policy is a limit to the number of connections to an application instance. In one example, an application instance is for a website application. One policy is to limit the number of users to the website application to 100 users.

Another policy is to reserve capacity on a computer server for an application instance. In one example, a percentage of CPU processing time on the computer server is reserved for an application instance and not scheduled for execution of other application instances. In this example, if the percentage is zero or low, then the application scheduler 150 can schedule many applications on a computer server to maximize utilization. If the percentage is high, this condition may be advantageous to applications where the number of application instances deployed for the estimated load is low. Some policies may control the migration of application instances between computer servers. One example of migration is discussed in further detail below in FIG. 8.

In some embodiments, the policies are based on server classes. Server classes are a collection of computer servers that have the same characteristics or capabilities. In one example, a server class named "AIX51" includes a set of computer server running AIX 5.1 on one CPU with 1 GB of memory. In another example, an application instance is started or restored only within a certain server class. In one embodiment, the server class file comprises the following fields: ServerClass ID string, number of CPUs, memory size, operating system, architecture, hard CPU usage limit, and hard memory usage limit.

Policies may also set priorities for applications. Another example of a policy is for server sharing. Another policy is to resize the computer server for dynamic reconfiguration of the computer server. Another policy is for applying the policies in auto mode or a manual mode with computer operator input.

Returning to FIG. 3 in step 304, the application scheduler 150 receives resource usage information from the computer servers 122, 132, and 142. Usage information is any information or data that indicate the performance of the applications and the computer servers. In one example, the usage information includes resource usage information and user load information. Some examples of usage information are CPU usage, memory usage, number of connections to an application instance, and the number of users.

In one embodiment, a performance monitor collects runtime information about the application instances on every computer server. The performance monitor then reports to a performance collector the runtime information including the utilization of computer servers. The performance data collector 210 then collects the usage information from the computer servers 122, 132, and 142, the resource controllers 120, 130, and 140, and the load balancer 110 and then transfers the usage information to the application scheduler 150.

In step 306, the application scheduler 150 receives user load information from the load balancer 110. In step 308, the application scheduler 150 applies the policies to the resource usage information and the user load information to determine whether there are any policy violations. In step 310, the application scheduler 150 checks whether there are any policy violations. If there are no violations, the application scheduler 150 returns to step 304.

If there are policy violations, the application scheduler 150 determines modification actions based on the policy violations, the resource usage information, and the user load information in step 312. A modification action is any action or process configured to change the operation or configuration of the application, application instance, or the computer server. One example of the modification action is to start or stop an application or an application instance. Another example of the modification action is to change the application instance from a running mode to a sleeping mode. Another example of a modification action is to migrate the application instance to another server. The application scheduler 150 then generates and transmits an instruction for the modification action in step 314 before returning to step 304.

Figure 4:
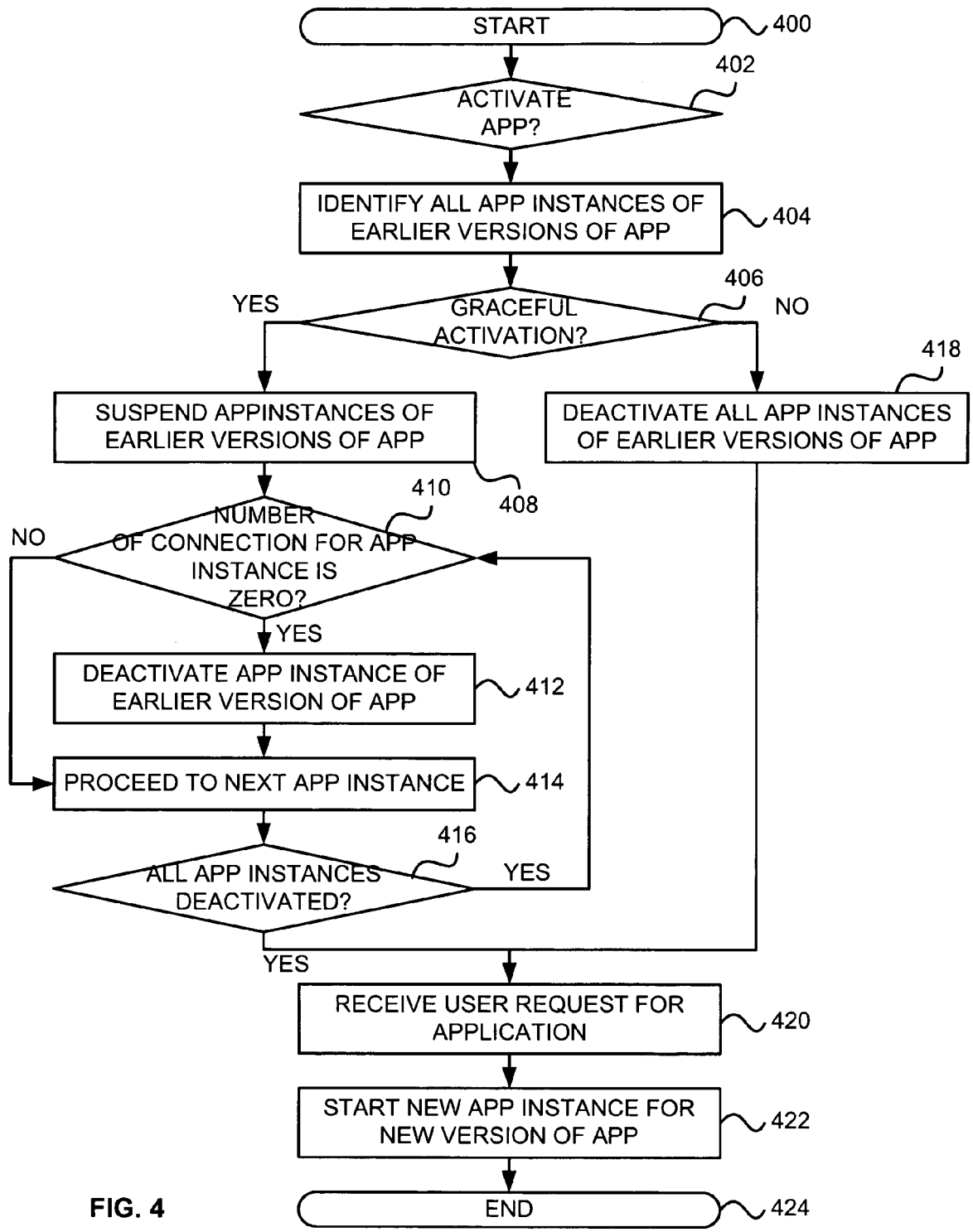
FIG. 4 is a flowchart for activating an application in an exemplary implementation of the invention.

Once the application is activated, application instances for the application can then be activated. FIG. 4 depicts a flowchart for activating an application in an exemplary implementation of the invention. FIG. 4 begins in step 400. In step 402, the application scheduler 150 checks whether to activate an application. Requests to activate an application may be done by any person such as users or administrators. In some embodiments, the application scheduler 150 receives deployment messages to activate or deactivate an application. In one example, the deployment message includes an application version number. This application version number is used in some embodiments to deactivate all application instances of earlier versions. In some embodiments, applications are activated or deactivated on a predetermined schedule.

In step 404, the application scheduler 150 identifies all the application instances of earlier versions of the application. In step 406, the application scheduler 150 checks whether the activation/deactivation is graceful or with extreme prejudice. If the activation/deactivation is with extreme prejudice, the application scheduler 150 deactivates all the application instances for the earlier versions of the applications regardless of whether there were existing connections from the application instances to the users in step 418 before proceeding to step 420.

If the activation/deactivation is graceful, the application scheduler 150 suspends the application instances of the earlier version of the applications so no other connections can be made to the application instances in step 408. In step 410, the application scheduler 150 checks whether the number of connections to the application instance is zero. If the number of connections is not zero, the application scheduler 150 proceeds to the next application instance in step 414. The application scheduler 150 will loop to wait for connections to the application instance to return to zero to perform a graceful activation/deactivation that waits until user are finished with the application instances. If the number of connections to the application instance is zero, the application scheduler 150 deactivates the application instance of the earlier version of the application in step 412. The application scheduler 150 then proceeds to the next application instance in step 414. In step 416, the application scheduler 150 checks whether all the application instances for the earlier versions of the application have been deactivated. If all the application instances have not been deactivated, the application scheduler 150 returns to step 410. If all the application instances have been deactivated, the application scheduler 150 proceeds to step 420.

In step 420, the application scheduler 150 receives a user request for an application. In step 422, the application scheduler 150 starts a new application instance for a new version of the application in step 422. The process for starting a new application instance is discussed in further detail below in FIG. 6. FIG. 4 ends in step 424.

Figure 5:
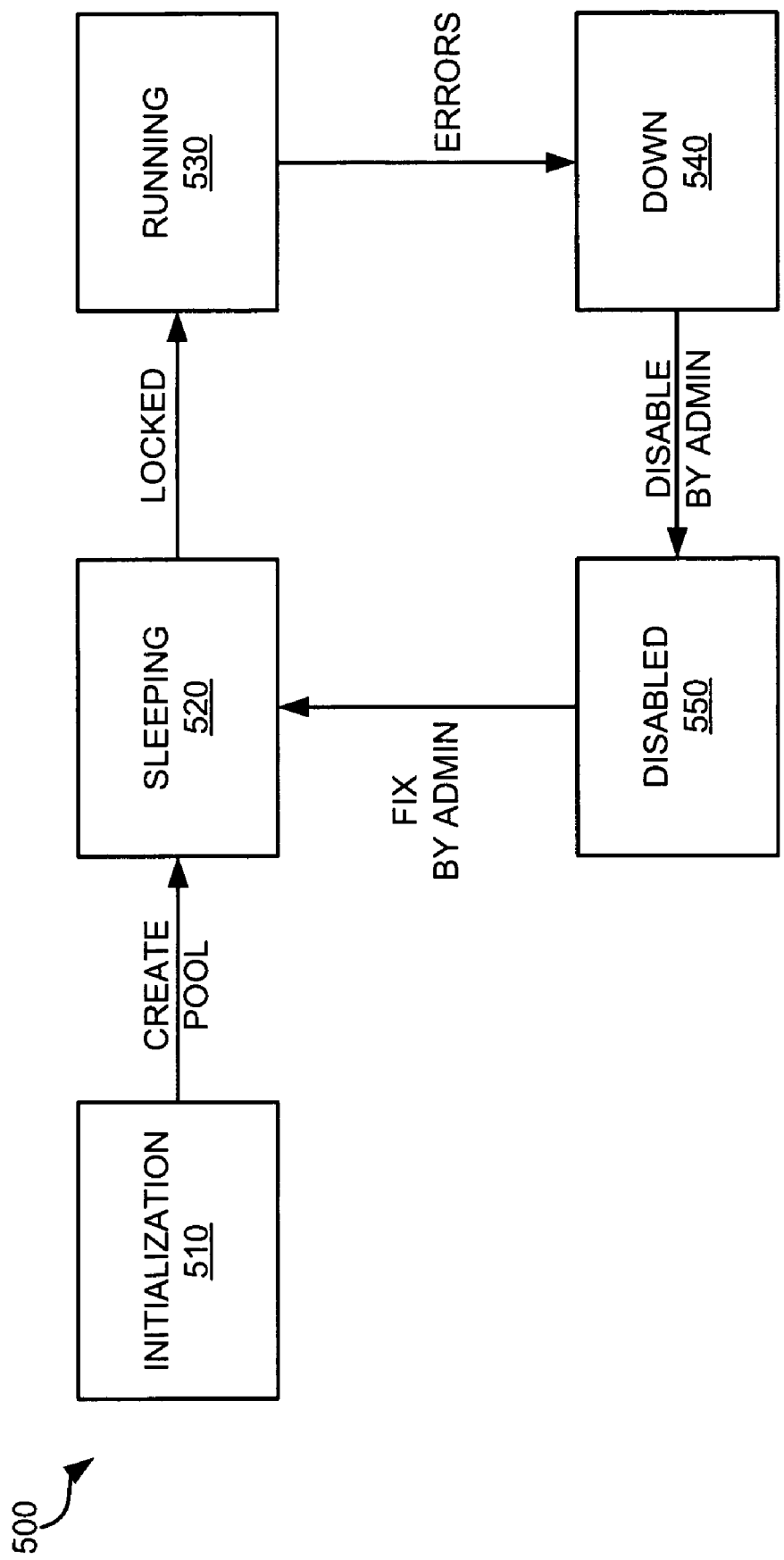
FIG. 5 is a state chart for an application instance in an exemplary implementation of the invention.

FIG. 5 depicts a state chart for an application instance in an exemplary implementation of the invention. The application instance begins in the initialization state 500 once the application instance is created. Once an instruction is received to create a pool, the application instance transitions to a sleeping state 520. This sleeping state 520 is a "runnable state." If the application instance is not locked by any user, the application instance can be acquired/locked and used. The application instance then transitions to a running state 530. If there are errors while in the running state, the application instance transitions to a down state 540. If there is an instruction to disable by an administrator, the application instance proceeds to a disabled state 550. Once the application instance is fixed by the administrator, the application instance returns to a sleeping state 520.

Figure 6:
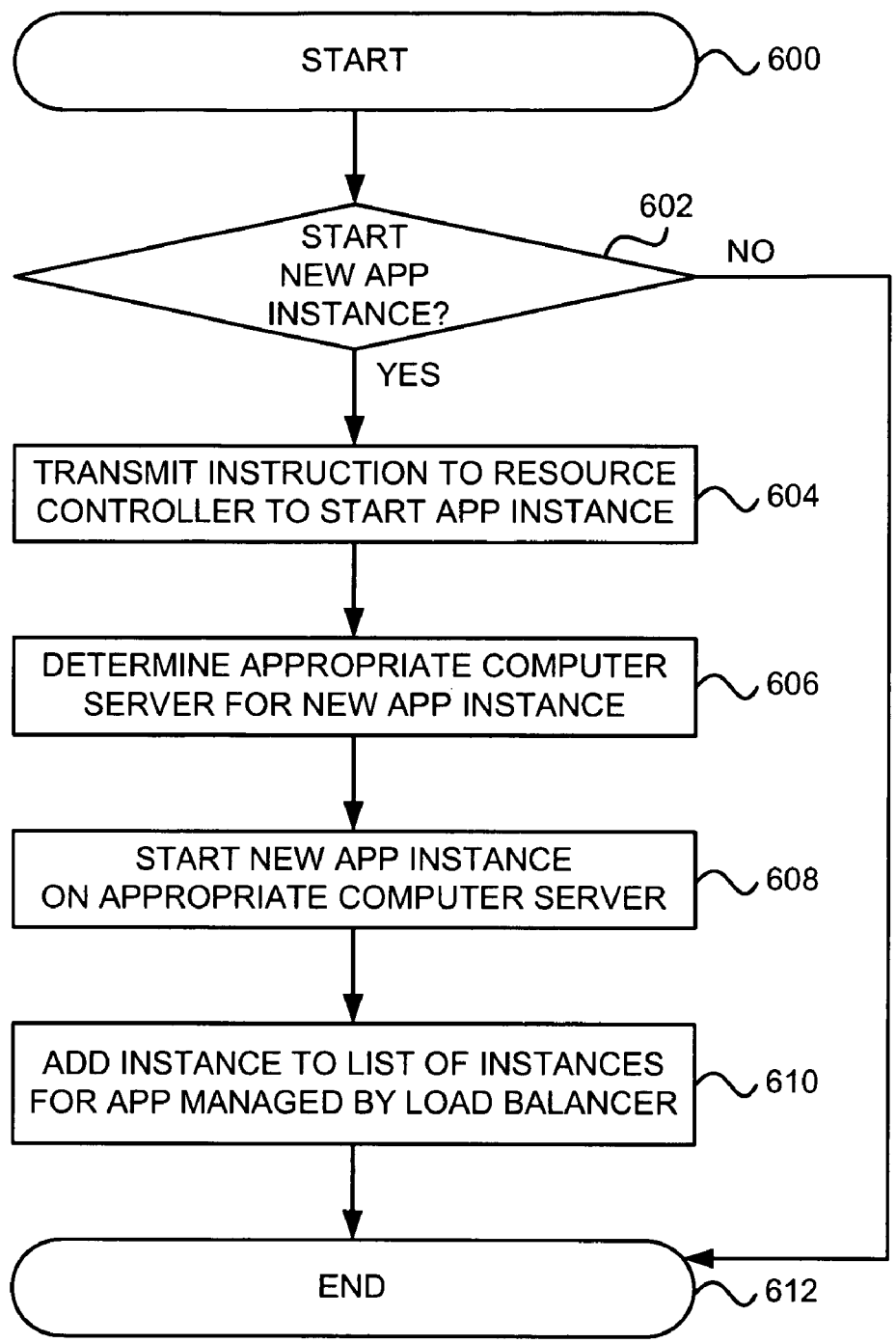
FIG. 6 is a flowchart for starting a new application instance in an exemplary implementation of the invention.

FIG. 6 depicts a flowchart for starting a new application instance in an exemplary implementation of the invention. Starting a new application instance is also called scaling up. In one example of scaling up, an application instance on a computer server has reached the peak load for users. The application scheduler 150 then determines that a modification action for scaling up is needed based upon a policy. Then, the application scheduler 150 scales up the application by adding a new application instance on another computer server. Therefore, the application as a whole can handle more users by scaling up. Also, computing resources on the computer server are not consumed until the computing resources are needed by the applications.

FIG. 6 begins in step 600. In step 602, the application scheduler 150 checks whether to start a new application instance. If there is no indication to start a new application instance, the process ends in step 612. If there is an indication to start a new application instance for an application, the application scheduler 150 transmits an instruction to the resource controller 120 to start an application instance in step 604. The resource controller 120 then determines the appropriate computer server 122 for a new application instance in step 606. In other embodiments, the application scheduler 150 determines the appropriate computer server 122 for a new application instance. There are many factors such as current processor or memory usage used in determining the appropriate server for a new application instance.

In step 608, the new application instance is started on the appropriate computer server 122. In other embodiments, there already may be an application instance in a sleeping or inactive mode. In these embodiments, the state of the application instances is changed to a running or active state in step 608. In step 610, the application scheduler 150 adds the application instance to the list of application instances for the application where the list is managed by the load balancer 110. FIG. 6 ends in step 612.

Figure 7:
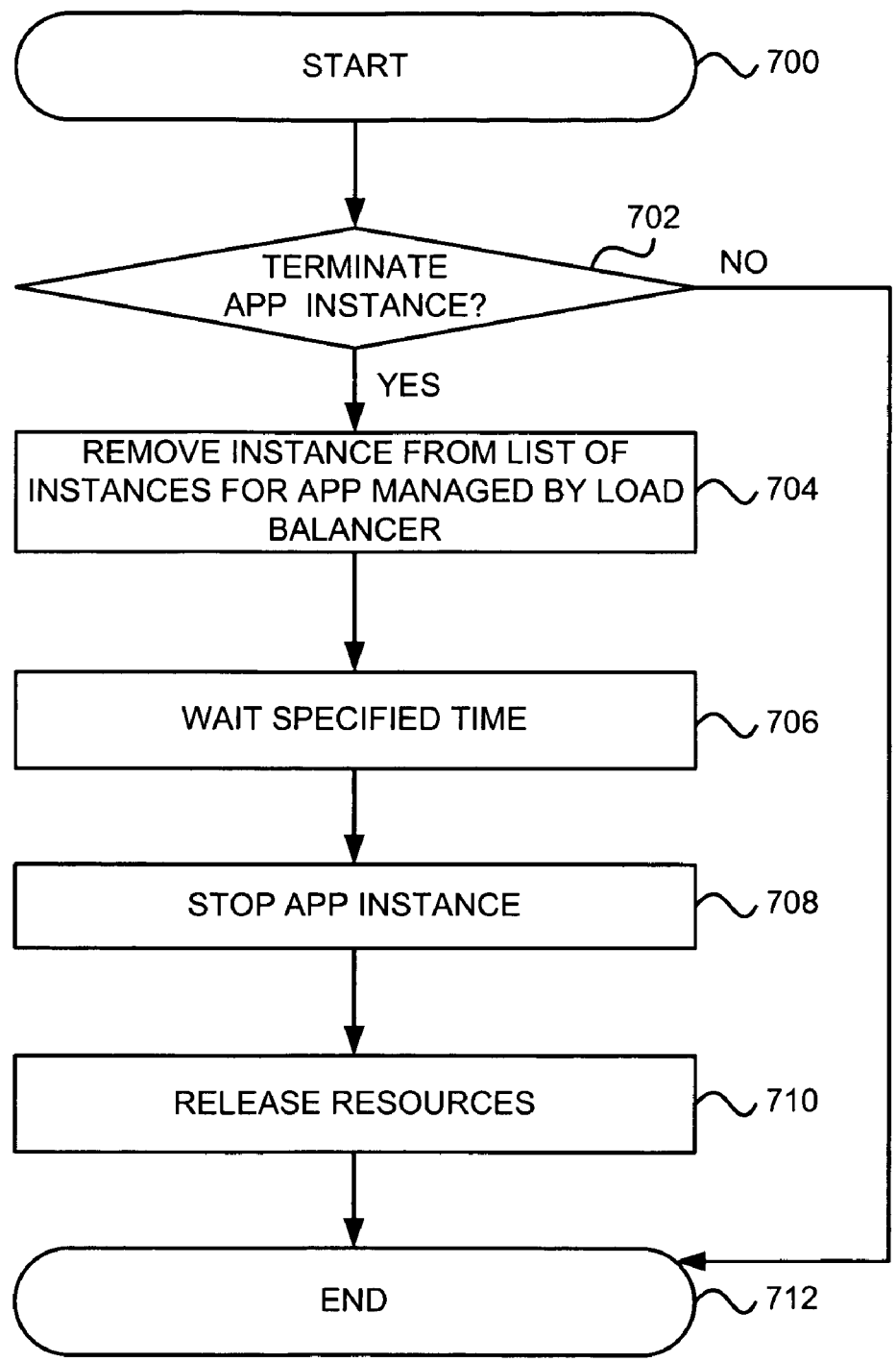
FIG. 7 is a flowchart for terminating an application instance in an exemplary implementation of the invention.

FIG. 7 depicts a flowchart for terminating an application instance in an exemplary implementation of the invention. Terminating an application instance is also called scaling down. Scaling down advantageously releases computing resources when not needed by applications. For example, if no users are using an application instance, there is no need for the application instance to continue running and consuming computing resources.

FIG. 7 begins in step 700. In step 702, the application scheduler 150 checks whether to terminate an application instance. If there is no indication to terminate an application instance, the process ends in step 712. In step 704, if there is an indication to terminate the application instance for an application, the application scheduler 150 removes the application instance from the list of application instances for the application where the list is managed by the load balancer 710. This step will ensure that no more user requests are directed to this application instance.

In step 706, the application scheduler 150 then waits a specified time. In step 708, the application instance is stopped. In other embodiments, instead of terminating the application instance, the state of the application instance is changed to an inactive or sleeping state in step 708. The resource controller 120 then releases the resources the application instance was using for other applications in step 710. FIG. 7 ends in step 712.

Figure 8:
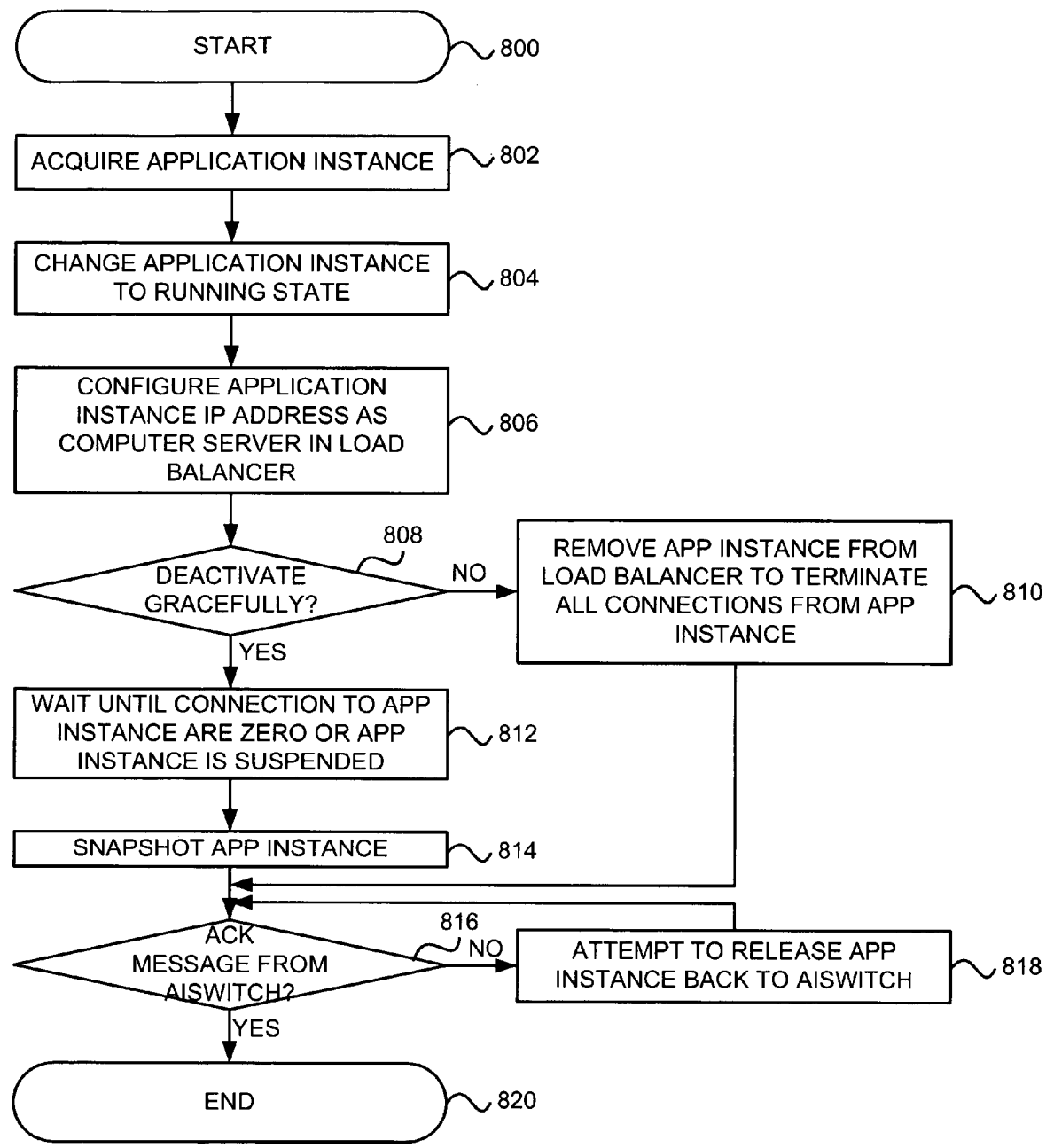
FIG. 8 is a flowchart for deactivating an application instance in an exemplary implementation of the invention.

FIG. 8 is a flowchart for deactivating an application instance in an exemplary implementation of the invention. FIG. 8 begins in step 800. In step 802, the application scheduler 150 acquires the application instance. In step 804, the application scheduler 150 changes the application instance to a running state. In step 806, the application scheduler 150 configures the application instance's IP address as a computer server in the load balancer 110. The application instance can then share user loads with other running application instances. In step 808, the application scheduler 150 checks whether to deactivate gracefully or by extreme prejudice. If the deactivation is by extreme prejudice, the application instance is removed from the load balancer 110 to terminate all the connections to the application instance in step 810 before proceeding to step 816.

If the deactivation is graceful, the application scheduler 150 waits until the connections to the application instances are zero or when the application is suspended in step 812. The application scheduler 150 then snapshots the application instance in step 814. In step 816, the application scheduler 150 checks whether an acknowledgement message is received from the AISwitch in step 816. If no acknowledgement message is received, the application scheduler 150 attempts to release the application instance back to the AISwitch 270 in step 818 before returning to step 816. If the acknowledge message is received, the process ends in step 820.

Another policy for managing applications is migration. Migration is the process of moving a running application instance from one computer server to another, while the application is servicing users. This policy is advantageous in scaling up an application instance by migrating it from a smaller (lower capacity) computer server to a larger computer server. When an application is migrated from one computer server to another, the connections to existing application users are migrated transparently. The application scheduler applies this migration policy similar to any other policy violation actions as described in FIG. 3.

By managing applications through the use of policies, the application scheduler 150 advantageously allows runtime application scheduling based on load conditions. Additionally, the application scheduler 150 also provides dynamic resource allocation based on resource availability. Both of these functions result in increased server utilization in a data center. This increased utilization and improved efficiency has significant economic benefit in lowering operation and capital costs of a data center.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention.

Those skilled in the art are familiar with instructions, processor, and storage media. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method of managing a plurality of applications comprising application instances running on a plurality of computer servers, the method comprising:
   receiving at least one policy for managing the applications over the computer servers;
   receiving usage information indicating performance of the applications and the computer servers;
   applying the at least one policy to the usage information to determine whether policy violations exist; and
   determining and executing a modification action of the applications in response to the policy violation.

2. The method of claim 1, wherein the modification action comprises activating an application instance on one of the computer servers.

3. The method of claim 1, wherein the modification action comprises deactivating an application instance on one of the computer servers.

4. The method of claim 1, wherein the modification action comprises migrating an application instance between the computer servers.

5. The method of claim 1, wherein the usage information comprises processor usage.

6. The method of claim 1, wherein the usage information comprises memory usage.

7. The method of claim 1, wherein the usage information comprises a number of users.

8. The method of claim 1, wherein the usage information comprises application response time to user requests.

9. The method of claim 1, wherein the usage information comprises a number of connections to one of the applications.

10. The method of claim 1, wherein the at least one policy comprises enforcing a limit on processor usage.

11. The method of claim 1, wherein the at least one policy comprises enforcing a limit on memory usage.

12. The method of claim 1, wherein the at least one policy comprises enforcing a limit on connections to the applications.

13. The method of claim 1, wherein the at least one policy comprises enforcing a limit on users to the applications.

14. The method of claim 1, wherein the at least one policy is based on a server class.

15. The method of claim 1, further comprising generating and transmitting an instruction for the modification action.

16. A computer-accessible memory medium that store program instructions implementing an application scheduler, wherein the program instructions are executable by a processor to:
   receive at least one policy for managing the applications over the computer servers;
   receive resource usage information indicating performance of the computer servers;
   receive user load information indicating usage by users of the applications;
   compare the at least one policy with the resource usage information and the user load information to determine whether policy violations exist; and
   determine and execute a modification action of the applications in response to the policy violation.

17. The memory medium of claim 16, wherein the modification action comprises activating an application instance on one of the computer servers.

18. The memory medium of claim 16, wherein the modification action comprises deactivating an application instance on one of the computer servers.

19. The memory medium of claim 16, wherein the modification action comprises migrating an application instance between the computer servers.

20. The memory medium of claim 16, wherein the usage information comprises processor usage.

21. The memory medium of claim 16, wherein the usage information comprises memory usage.

22. The memory medium of claim 16, wherein the usage information comprises a number of users.

23. The memory medium of claim 16, wherein the usage information comprises application response time to user requests.

24. The memory medium of claim 16, wherein the usage information comprises a number of connections to one of the applications.

25. The memory medium of claim 16, wherein the at least one policy comprises enforcing a limit on processor usage.

26. The memory medium of claim 16, wherein the at least one policy comprises enforcing a limit on memory usage.

27. The memory medium of claim 16, wherein the at least one policy comprises enforcing a limit on connections to the applications.

28. The memory medium of claim 16, wherein the at least one policy comprises enforcing a limit on users to the applications.

29. The memory medium of claim 16, wherein the at least one policy is based on a server class.

30. The memory medium of claim 16, wherein the program instructions are further executable to generate and transmit an instruction for the modification action.

31. A system for managing a plurality of applications running on a plurality of computer servers, the system comprising:
   an application scheduler configured to receive at least one policy for managing the applications over the computer servers, receive resource usage information indicating performance of the computer servers, receive user load information indicating usage by users of the applications, compare the at least one policy with the resource usage information and the user load information to determine whether policy violations exist, and determine and execute a modification action of the applications in response to the existing policy violation; and a resource controller configured to perform the modification action on the applications.

32. The system of claim 31, wherein the modification action comprises activating an application instance on one of the computer servers.

33. The system of claim 31, wherein the modification action comprises deactivating an application instance on one of the computer servers.

34. The system of claim 31, wherein the modification action comprises migrating an application instance between the computer servers.

35. The system of claim 31, wherein the usage information comprises processor usage.

36. The system of claim 31, wherein the usage information comprises memory usage.

37. The system of claim 31, wherein the usage information comprises a number of users.

38. The system of claim 31, wherein the usage information comprises application response time to user requests.

39. The system of claim 31, wherein the usage information comprises a number of connections to one of the applications.

40. The system of claim 31, wherein the at least one policy comprises enforcing a limit on processor usage.

41. The system of claim 31, wherein the at least one policy comprises enforcing a limit on memory usage.

42. The system of claim 31, wherein the at least one policy comprises enforcing a limit on connections to the applications.

43. The system of claim 31, wherein the at least one policy comprises enforcing a limit on users to the applications.

44. The system of claim 31, wherein the at least one, policy is based on a server class.

45. The system of claim 31, wherein the application scheduler is further configured to generate and transmit an instruction for the modification action.

* * * * *